US012748974B2

(12) United States Patent
Yousefi Maragheh et al.

(10) Patent No.: US 12,748,974 B2
(45) Date of Patent: Sep. 29, 2026

(54) SYSTEMS AND METHODS FOR HYBRID OPTIMIZATION TRAINING OF MULTINOMIAL LOGIT MODELS

(71) Applicant: Walmart Apollo, LLC, Bentonville, AR (US)

(72) Inventors: Reza Yousefi Maragheh, Santa Clara, CA (US); Ramin Giahi, Rego Park, NY (US); Aysenur Inan, Mountain View, CA (US); Hyun Duk Cho, San Francisco, CA (US); Kaushiki Nag, Sunnyvale, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 909 days.

(21) Appl. No.: 18/104,021

(22) Filed: Jan. 31, 2023

(65) Prior Publication Data

US 2024/0256874 A1 Aug. 1, 2024

(51) Int. Cl.
*G06N 3/084* (2023.01)
*G06N 3/09* (2023.01)
*G06N 3/098* (2023.01)

(52) U.S. Cl.
CPC ............... *G06N 3/084* (2013.01); *G06N 3/09* (2023.01); *G06N 3/098* (2023.01)

(58) Field of Classification Search
CPC ........ G06N 3/084; G06N 20/00; G06N 3/098; G06N 3/09
See application file for complete search history.

(56) References Cited

U.S. PATENT DOCUMENTS 7,596,475 B2 9/2009 Thiesson et al.
9,892,171 B2 2/2018 Ovsjanikovs et al.
(Continued)

FOREIGN PATENT DOCUMENTS

CN 114220489 A 3/2022

OTHER PUBLICATIONS

Tang, X., & Aw, A. (2020). FILM: A Fast, Interpretable, and Low-rank Metric Learning Approach for Sentence Matching. arXiv preprint arXiv:2010.05523. (Year: 2020).*
(Continued)

*Primary Examiner* — Kamran Afshar
(74) *Attorney, Agent, or Firm* — Morgan, Lewis & Bockius LLP; Manita Rawat

(57) ABSTRACT

Systems and methods for hybrid optimization of training ranking models is disclosed. A training dataset including a plurality of anchor items, a plurality of recommended item sets, and ground truth data is obtained from a database. A base machine learning model including a step function configured to determine a relevance score is iteratively trained to generate a trained ranking model. The plurality of anchor items and the plurality of recommended item sets are provided as an input to the base machine learning model and the ground truth is provided as a target output. The step function is trained using an adaptive step size according to a first order Barzilai-Borwein (BB) method and a line search method. The trained ranking model is stored in non-transitory memory.

20 Claims, 6 Drawing Sheets

(56) References Cited

U.S. PATENT DOCUMENTS

| | | | |
|---|---|---|---|
| 11,037,179 | B2 | 6/2021 | Wagner |
| 2017/0161757 | A1 | 6/2017 | Zenor et al. |

OTHER PUBLICATIONS

Du, M., Tan, H., & Chen, A. (2021). A faster path-based algorithm with Barzilai-Borwein step size for solving stochastic traffic equilibrium models. European Journal of Operational Research, 290(3), 982-999. (Year: 2021).*

Kaoudi, Z., Quiané-Ruiz, J. A., Thirumuruganathan, S., Chawla, S., & Agrawal, D. (May 2017). A cost-based optimizer for gradient descent optimization. In Proceedings of the 2017 ACM International Conference on Management of Data (pp. 977-992). (Year: 2017).*

Muqing Du, et al., "A faster path-based algorithm with Barzilai-Borwein step size for solving stochastic traffic equilibrium models," European Journal of Operational Research, (2020), 18 pages.

* cited by examiner

SYSTEMS AND METHODS FOR HYBRID OPTIMIZATION TRAINING OF MULTINOMIAL LOGIT MODELS

TECHNICAL FIELD

This application relates generally to training of machine learning models, and more particularly, to optimization of training for multinomial logit models.

BACKGROUND

Current predictive systems utilize trained machine learning models to generate next state predictions. Next state predictions can include predictions of items for inclusion or display in a network interface, interface intents, and/or other elements of a network interface. Elements or intents identified by trained machine learning models can increase engagement with a provided network interface, resulting in both better user engagement and interface results.

In order to generate predictions, a machine learning model must first be trained using a training dataset. Training a machine learning model requires a significant investment of time and computing power. Once a machine learning model is trained, the predictions generated by the model are consistent and do not change over time. Because the training time for current models can be significant, current systems are not able to react to changing trends or preferences in real-time.

SUMMARY

In various embodiments, a system is disclosed. The system includes a non-transitory memory configured to store a training dataset comprising a plurality of anchor items, a plurality of recommended item sets, and ground truth data and a processor communicatively coupled to the non-transitory memory. The processor is configured to read a set of instructions to obtain, from the database, the training dataset. obtain a base machine learning model including a step function configured to determine a relevance score, and iteratively train the base machine learning model to generate a trained ranking model. The plurality of anchor items and the plurality of recommended item sets are provided as an input to the base machine learning model and the ground truth is provided as a target output. The step function is trained using an adaptive step size according to a first order Barzilai-Borwein (BB) process. The processor is further configured to store the trained ranking model in the non-transitory memory.

In various embodiments, a computer-implemented method is disclosed. The method includes steps of obtaining, from a first database, a training dataset comprising a plurality of anchor items, a plurality of recommended item sets, and ground truth data, obtaining, from a second database, a base machine learning model including a step function configured to determine a relevance score, training the base machine learning model to generate a trained ranking model, and storing the trained ranking model in the non-transitory memory. The plurality of anchor items and the plurality of recommended item sets are provided as an input to the base machine learning model and the ground truth is provided as a target output. The step function is trained using an adaptive step size according to a first order Barzilai-Borwein (BB) process.

In various embodiments, a non-transitory computer-readable medium having instructions stored thereon is disclosed.

The instructions, when executed by at least one processor, cause a device to perform operations including obtaining, from a first database, a training dataset comprising a plurality of anchor items, a plurality of recommended item sets, and ground truth data, obtaining, from a second database, a base machine learning model including a step function configured to determine a relevance score, training the base machine learning model to generate a trained ranking model, and storing the trained ranking model in the non-transitory memory. The plurality of anchor items and the plurality of recommended item sets are provided as an input to the base machine learning model and the ground truth is provided as a target output. The step function is trained using an adaptive step size according to a first order Barzilai-Borwein (BB) process.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
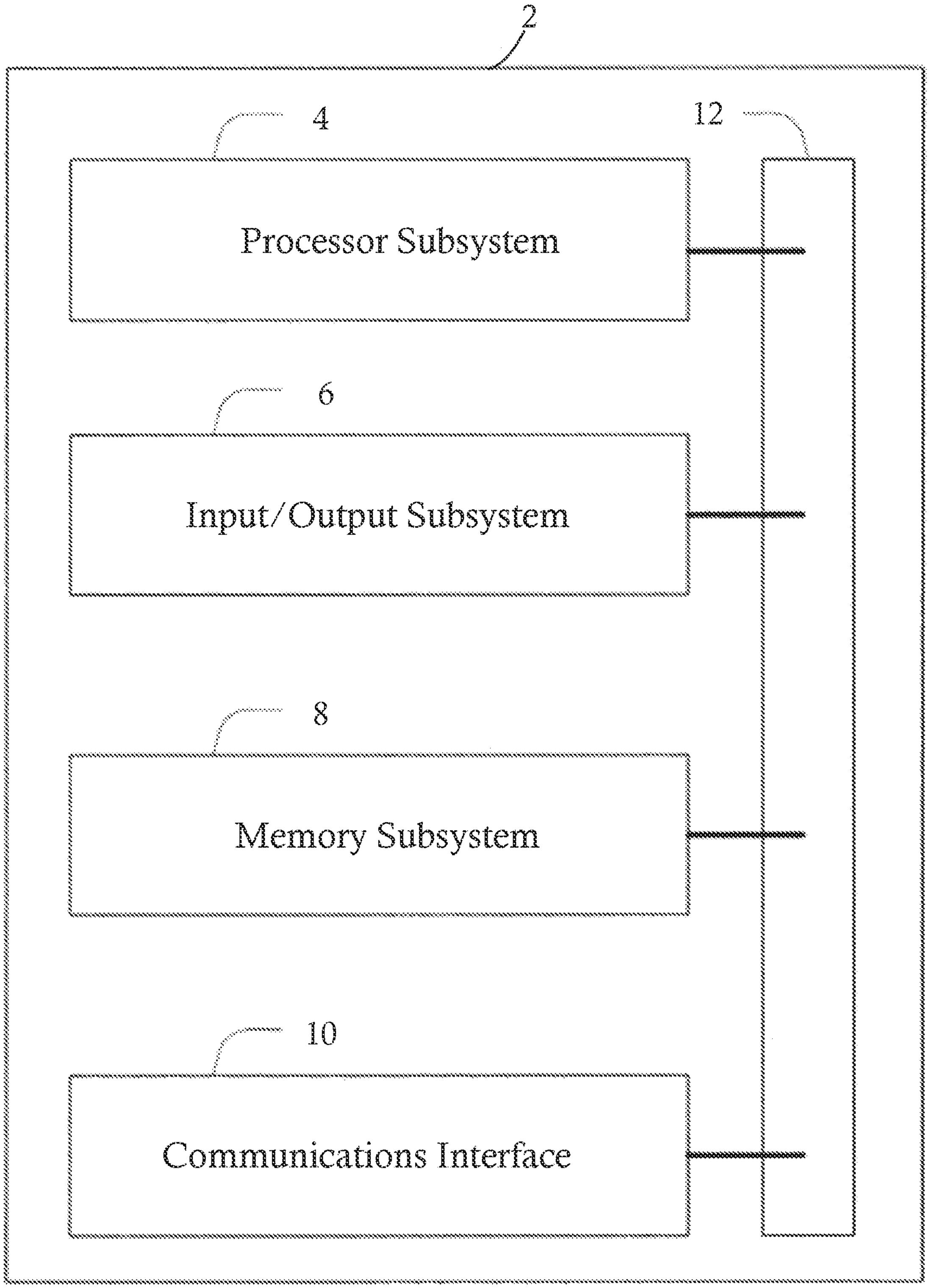
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for hybrid optimization training of MLC models and deployment of trained MLC models for listwise ranking. In various embodiments, a trained MLC model is generated by a hybrid optimization training process including a hybrid algorithm, such as a Barzilai-Borwein (BB) Method. The trained MLC model is configured to receive a set of feature inputs including a base item, anchor items, anchor features, item badges, user engagement features, and/or context features and generate a set of ranked suggested items for inclusion in a network interface.

In various embodiments, the disclosed hybrid optimization training process provides a scalable training process that is configured to provide faster convergence within a lightweight framework. The hybrid optimization training facilitates more frequent training that can capture nuances and changes in training and/or input data. The hybrid optimization training process generates formatted data for use in matrix operations to decrease training times and incorporate contextual features to provide item recommendations that are optimized from a module perspective and that are contextually appropriate.

In some embodiments, systems, and methods for deployment of MLC models includes generating one or more trained MLC models configured to generate ranked sets of suggested items for inclusion in a network interface. In some embodiments, the set of ranked items is selected from a set of items available in an e-commerce catalog that can be presented to a user for engagement. In some embodiments, a hybrid optimization training process can provide a decreased development and deployment time for trained MLC models. For example, the hybrid optimization training process provides a better algorithmic design, parallelization of gradient computation, and transformed data inputs that each contribute to reduced training times and faster convergence for trained models. In some embodiments, the hybrid optimization training process can develop and deploy MLC models about four times faster as compared to traditional MLC training processes.

In some embodiments, deployment of MLC models trained using a hybrid optimization training process allows for flexible recommendations of items for inclusion in network interfaces, for example, seasonal items within an e-commerce environment. Updated and frequently trained MLC models can reflect business and/or user needs or trends and provide faster convergence for deployment than traditionally trained ranking modules. For example, in an e-commerce environment, deployment of frequently trained recommendation models, such as MLC ranking models as described below, allows for up-to-date recommendations to users based on various item features, user features, and/or other features relevant on shorter time frames.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a neural network which is trained (e.g., configured or adapted) to provide listwise ranking of items, such as sets of items contained within an e-commerce catalog, is disclosed. A neural network trained to generate listwise rankings may be referred to as a trained ranking algorithm and/or a trained ranking model. The trained ranking model can be configured to receive a set of inputs, such as, for example, a base item, anchor features, item badges, user engagement features, and/or context features and generate a set of ranked suggested items for inclusion in a network interface, and output a ranked list of items selected from a set of items, such as a set of items within an e-commerce catalog.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for hybrid optimization training of MLC models and/or deployment of trained MLC models, as described herein. The instruction set can be stored in any acceptable form of machine-readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processor subsystem 4.

Figure 2:
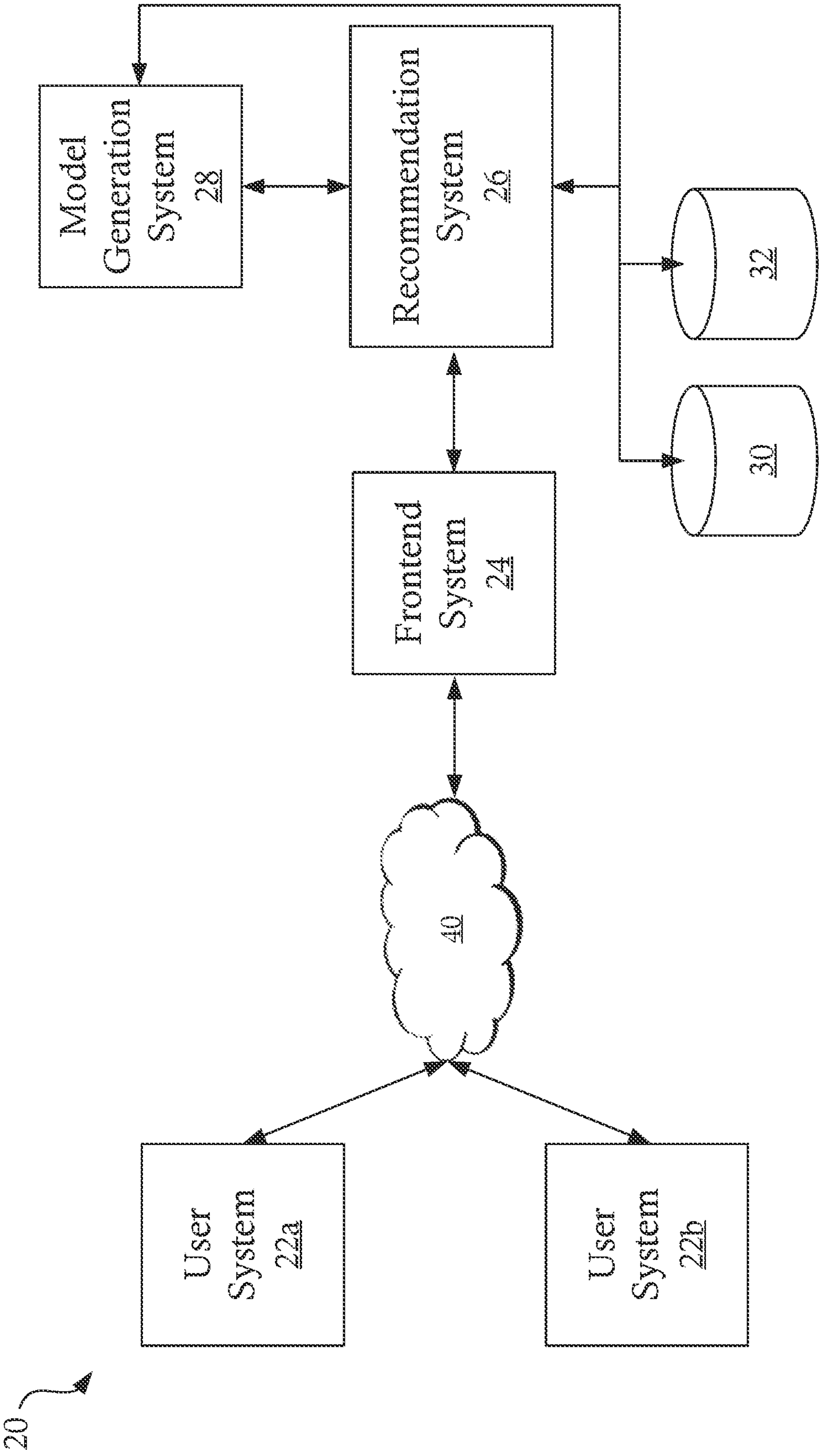
FIG. 2 illustrates a network environment configured to provide hybrid optimization training for multinomial logit choice (MLC) models, in accordance with some embodiments.

FIG. 2 illustrates a network environment 20 configured to provide hybrid optimization of training MLC models and deployment of trained listwise ranking MLC models, in accordance with some embodiments. The network environment 20 includes a plurality of systems configured to communicate over one or more network channels, illustrated as network cloud 40. For example, in various embodiments, the network environment 20 can include, but is not limited to, one or more user systems 22*a*, 22*b*, a frontend system 24, an item recommendation system 26, a model training system 28, an item database 30, and a model store 32. Although specific embodiments are discussed herein, it will be appreciated that any suitable systems, databases, storage mechanisms, servers, etc. can be included within the network environment 20.

Further, although embodiments are illustrated having discrete systems, it will be appreciated that, in some embodiments, one or more systems, such as the frontend system 24, the item recommendation system 26, and/or the model training system 28 can be combined into a single system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the user systems 22*a*, 22*b* are operable by one or more users to access a network interface provided by the frontend system 24. The network interface can include any suitable interface, such as, for example, a web or internet-based interface configured to provide one or more interface pages (e.g., webpages) for user interaction. Examples of network interfaces can include, but are not limited to, e-commerce interfaces, service interfaces, and/or any other suitable network interface. The frontend system 24 can be configured to provide any suitable resources required for generation and operation of the network interface, such as, for example, one or more components of a server.

In some embodiments, the frontend system 24 includes an interface generation engine configured to provide a network interface, such as a webpage, including one or more recommended or system selected items. The recommended items can be generated by an item recommendation system 26. The item recommendation system 26 is configured to receive an anchor item identifier and generate a set of complimentary, or recommended items. The anchor item identifier can relate to an item that was interacted with, e.g., searched for, added to a cart, purchased, viewed, etc., by a user via a user device 22*a*, 22*b* when interacting with an interface provided by the frontend system 24. In some embodiments, the frontend system 24 transmits a request for recommended items for inclusion in a user interface including the anchor item identifier to the recommendation system 26.

In some embodiments, the recommendation system 26 includes a ranking engine configured to generate a list of recommended items via one or more trained machine learning models, such as one or more trained ranking models. For example, a ranking engine can implement, or include, one or more trained MLC ranking models to generate a set of ranked item recommendations from a set of candidate items. In some embodiments, a trained MLC ranking model is configured to receive an anchor item identifier and candidate item identifiers for a plurality of items as inputs and generate a ranked list of recommended items as an output. The set of candidate items can include one or more items stored in an item database 30 and available through a network interface, such as, for example, one or more items available in an e-commerce catalog. In some embodiments, the recommendation system 26 retrieves the set of candidate items based on one or more rules related to the anchor item.

In some embodiments, the recommendation system 26 provides a ranked set of recommended items, i.e., a set of item identifiers for ranked items, to the frontend system 24. The frontend system 24 is configured to generate an interface, such as a webpage, including one or more of the recommended items. In some embodiments, the frontend system 24 is configured to insert recommended items into an interface in ranked order, i.e., beginning at the highest ranked recommended item and descending through the list of ranked items. In some embodiments, the frontend system 24 is configured to implement an explore-exploit mechanism configured to present a subset of the ranked recommended items selected, at least partially, out of order with respect to the generated ranking.

In some embodiments, the recommendation system 26 is configured to obtain a trained MLC ranking model from a model store, such as a model store database 30. The model store database 30 can include any suitable storage structure, such as, for example, a local memory structure, a remote memory structure, a distributed memory structure, a virtual memory structure, and/or any other suitable non-transitory memory structure. In some embodiments, the recommendation system 26 is configured to periodically retrieve at least one trained MLC model from the model store database 30 in order to provide the most-recently trained, or up to date, model.

In some embodiments, a model training system 28 includes a model training engine configured to generate trained MLC ranking models according to a hybrid optimization training process, as described in greater detail below. The hybrid optimization training process provides for rapid training and deployment of MLC ranking models for use by the recommendation system 26. In some embodiments, the disclosed hybrid optimization training process allows the model training system 28 to generate trained MLC ranking models about four times faster as compared to traditional training methods while utilizing less computing time and resources.

In some embodiments, the model training system 28, and particularly the model training engine, is configured to train one or more MLC ranking models at predetermined intervals and/or in response to trigger events. For example, in some embodiments, the model training system 28 is configured to train MLC ranking models at preset intervals, such as hourly, daily, weekly, etc. As another example, in some embodiments, the model training system 28 implements a hybrid optimization training process in response to a trigger event, such as one or more interface events (e.g., item search, add-to-cart, purchase, etc.), seasonal campaign timings, user input, and/or any other suitable triggers.

In some embodiments, the model training system 28 is configured to store trained MLC ranking models in a model store database 30 for deployment to one or more recommendation systems 26. When the model training system 28 completes training of a new or updated MLC ranking model, the model training system 28 can store the new or updated MLC ranking model in the model store database 30 in addition to existing MLC ranking models and/or can overwrite existing MLC ranking models in the model store database 30.

In some embodiments, the model training system 28 is configured to obtain training data from a training database 32. The training data obtained from the training database can include a set of items, such as a base item (e.g., an anchor item) and one or related items (e.g., recommended items, etc.). The base item and/or the related items include one or more features, such as, for example, anchor features related to the base item. Anchor features can include, but are not limited to, features related to comparisons between the base item and the recommended item such as saving amounts (e.g., difference in price between items), price-price band features, numeric reviews, ratings, offer types, and/or any other suitable anchor features. The training dataset can include additional features, such as item badge features (e.g., price tag features, fulfillment tag features, item availability features), user engagement features, context features, and/or any other suitable features. In some embodiments, the training database 32 is a distributed database configured to maintain a large scale data set.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

A multinomial logit (MNL) choice (MLC) model, also referred to as a discrete choice model, is a machine learning model based on multinomial logistic regression that predicts a probability of membership in three or more categories for a dependent variable based on multiple independent variables. The independent input variables of the MLC model can include categorical (e.g., binary, dichotomous, etc.)

variables and/or continuous (e.g., interval, scale, etc.) variables. MLC models include extensions of binary logistic regression models that allow for more than two categories for the dependent variable, e.g., more than two outcomes or probabilities. In some embodiments, an MLC model uses maximum likelihood estimation to evaluate a probability of membership in a category, e.g., probability of a given outcome from a range of possible outcomes.

In some embodiments, an MLC model can be configured as a listwise (re)ranking model. Listwise ranking models are configured to consider a list of outcomes, e.g., a list of items, and determine an optimal ordering for the list given a set of input variables. In some embodiments, a MLC model is trained to perform listwise ranking by minimizing a loss function comparing a generated ranked list and a ground-truth (e.g., labeled) list or ranking. Listwise reranking models are configured to rank and re-rank lists based on various parameters, e.g., to prioritize certain items related to predetermined objectives.

As one example, in some embodiments, a MLC model can be configured as a listwise reranking model for generating item recommendations in an e-commerce environment. The MLC model is configured to receive a set of inputs including user preference data (e.g., data related to and/or categorizing user preferences in the form of prior interactions, user demographics, user history, and/or any other suitable data related to user preferences) and a set of elements (e.g., interface elements related to a set of items available in an e-commerce catalog). The MLC model is configured to rank the set of elements (e.g., to provide a ranking of most-likely items to be selected/interacted with to least-likely items to be selected/interacted with) based on the user preferences (e.g., user-specific rankings).

Figure 3:
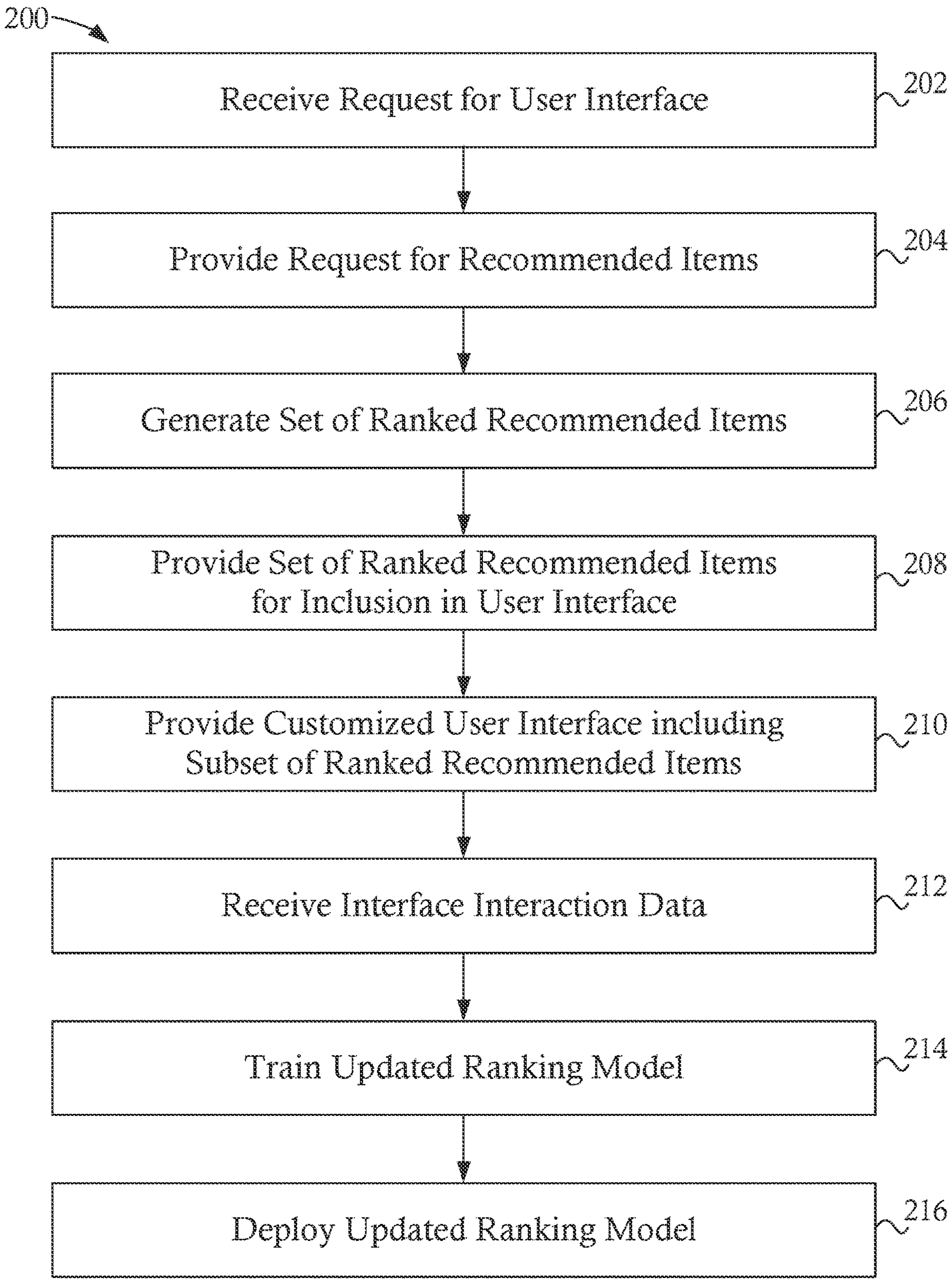
FIG. 3 is a flowchart illustrating a method of generating an interface including interface elements selected by an MLC model, in accordance with some embodiments.
Figure 4:
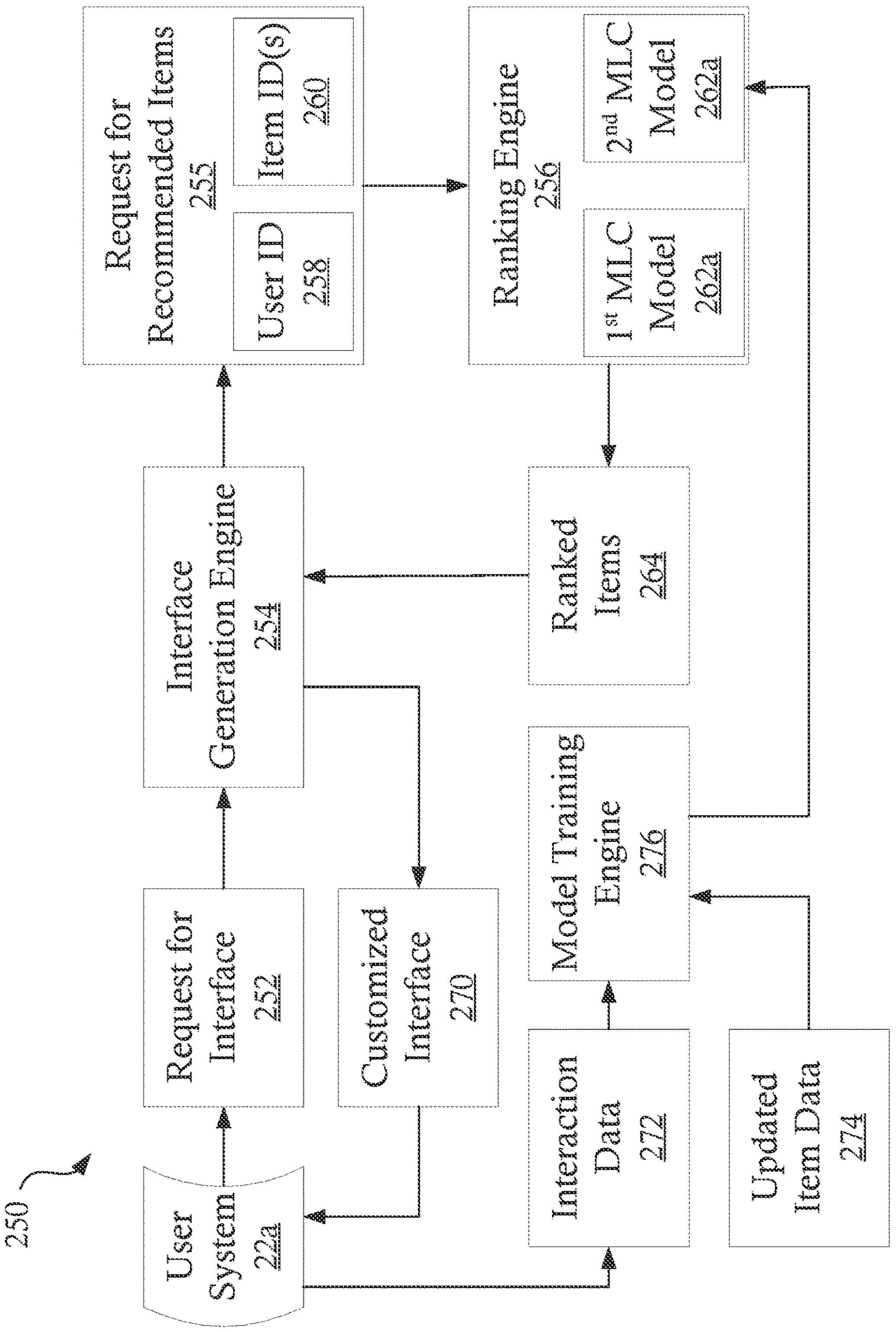
FIG. 4 is a process flow illustrating various steps of the method of generating an interface including interface elements selected by an MLC model, in accordance with some embodiments.

FIG. 3 is a flowchart illustrating a method 200 of generating an interface including interface elements selected by an MLC model, in accordance with some embodiments. FIG. 4 is a process flow 250 illustrating various steps of the method 200 of generating an interface including interface elements selected by an MLC model, in accordance with some embodiments. At step 202, a request 252 for a user interface is received by a user interface generation engine 254. The request 252 can generated by any suitable system, such as, for example, a user system 22*a*. In some embodiments, the request 252 is for an interface including one or more items, such as, for example, an e-commerce interface configured to present one or more items from an item catalog to a user. Although embodiments are discussed herein in the context of an e-commerce interface, it will be appreciated that the interface generation engine 254 can be configured to generate any suitable network interface including one or more items, e.g., one or more interface elements including one or more items, provided to a user.

At step 204, the interface generation engine 254 generates and provides a request 255 for recommended items, including a user identifier 258 and one or more item identifiers 260, to a ranking engine 256. The user identifier 258 includes data representative of user interactions between a user, such as a user of user device 22*a*, and the network interface. The user interaction data can include, but is not limited to, historical data, user preference data, user profile data, and/or any other suitable user data. The item identifiers 260 include data representative of one or more items available within a catalog, such as an e-commerce catalog. The items (e.g., data representative of the items) can be stored in a database, such as the database 30 illustrated in FIG. 2.

At step 206, the ranking engine 256 receives the request 255, including the user identifier 258 and/or the item identifiers 260, and generates a set of ranked items 264 related to, e.g., complimentary to, one or more items represented by the item identifiers 260. The received item identifier(s) 260 can be referred to as anchor, or base, items and the generated list of items can be referred to as recommended items. In some embodiments, the ranking engine 256 is configured to generate user-specific recommendations, e.g., list of items ranked, at least in part, based on user preferences and/or user historical data.

In some embodiments, the ranking engine 256 is configured to implement one or more trained ranking models, such as a first MLC ranking model 262*a*. The first MLC ranking model 262*a* is configured to receive a set of feature inputs, e.g., features representative of and/or related to the user identifier 258 and/or the item identifiers 260, and generate a set of ranked, or recommended, items 264. The first MLC ranking model 262*a* provides listwise ranking configured to prioritize certain items related to predetermined objectives as defined by an input data set and training process, discussed in greater detail below.

At step 208, the ranking engine 256 provides the set of ranked items 264 to the interface generation engine 254, which integrates one or more of the items in the set of ranked items 264 into the interface. For example, in some embodiments, the interface generation engine 254 is configured to generate an interface from a template that contains at least one container for receiving a set of N items, where N is an integer. The items inserted into the container can be selected by taking the top N-ranked items from the set of ranked items 264. As an alternative, a sampling of the set of ranked items 264 can be selected that includes both top ranked and lower-ranked (or unranked) items, e.g., utilizing explore and exploit mechanisms. It will be appreciated that any suitable process can be used to select items from the set of ranked items 264 and/or the catalog of items for presentation within the user interface.

At step 210, the interface generation engine 254 generates and transmits an interface 270, such as a webpage, mobile app page, and/or other interface page, to the system that generated the original request 252, such as, for example, a user system 22*a*. The interface allows interactions between the user device, e.g., a user interacting with the user device, and the interface to perform one or more operations. For example, in the context of an e-commerce environment, a user can add one or more items to a cart, view details of one or more items, search for additional items, purchase items, etc. The interface 270 presents the set of N items, including items selected from the set of ranked items 264, to the user as part of the interface 270.

At optional step 212, interaction data 272 and/or updated item data 274 is received. Interaction data can include data representative of interactions between one or more users and one or more interfaces, such as, for example, data indicative of an interaction between a user and the generated interface 270. In some embodiments, the interaction data 272 and/or the updated item data 274 is received by a model training engine 276. The interaction data 272 and/or the updated item data 274 can be provided directly to the model training engine 276 and/or can be stored in one or more storage mechanism, such as a database, that is in data communication with the model training engine 276. For example, in some embodiments, the interaction data 272 and/or the updated item data 274 is stored in a training database 32 as illustrated in FIG. 2.

At step 214, the interaction data 272 and/or the updated item data 274 is used, in conjunction with additional training data such as historical data, item feature data, and/or any other suitable training data, to generate updated or alternative MLC models. For example, in some embodiments, the model training engine 276 generates a second MLC ranking model 262*b*. The second MLC ranking model 262*b* includes an MLC model trained using a training dataset that includes at least a portion of the interaction data 272 and/or the updated item data 274. The second MLC ranking model 262*b* is configured to receive the set of inputs, e.g., the user identifier 258 and/or the one or more item identifiers 260, and generate a second set of ranked items. The second set of ranked items can be different, e.g., can have a different ranking and/or include different items, as compared to the first set of ranked items 264.

In some embodiments, MLC models, such as the first MLC ranking model 262*a* and/or the second MLC ranking model 262*b*, can be generated at a predetermined frequency using data that is updated between training sessions. The predetermined frequency, e.g., the interval between training of MLC ranking models 262*a*, 262*b*, can be selected based on any suitable parameters, such as, for example, available computing resources, costs-benefits, seasonal campaign frequency, user preference change frequency, and/or any other suitable parameter. For example, new MLC models can be generated at a fixed interval to capture trends or changing habits in interaction data for a given time period, such as during a seasonal campaign.

In some embodiments, MLC ranking models 262*a*, 262*b* can be generated in response to one or more events, such as, for example, seasonal campaigns being launched, interactions with certain items, changes in product catalogs, volumes of sales of a specific item exceeding a predetermined threshold, and/or any other suitable events. In some embodiments, a triggering event, such as a changing seasonal campaign, can alter additional parameters, such as the frequency of training new MLC models. It will be appreciated that any suitable event and/or temporal triggers can cause training of one or more additional MLC ranking models.

At step 216, the second MLC ranking model 262*b* can be deployed in addition or alternatively to the first MLC ranking model 262*a*. The hybrid optimization training process described below allows for faster training and convergence of MLC ranking models 262*a*, 262*b* such that MLC ranking models 262*a*, 262*b* can be trained and deployed at a frequency capable of capturing subtle changes in interaction behavior. For example, during a seasonal campaign, MLC ranking models 262*a*, 262*b* can be trained and deployed hourly, daily, weekly, and/or at other predetermined intervals in order to capture changing interaction behavior or trends, such as item preferences for items associated with the seasonal campaign, that would otherwise be lost due to longer training periods or less frequency model updates. Deploying updated MLC ranking models 262*a*, 262*b* at a higher frequency provides for a better user experience, as the elements selected for presentation to a user can be predicted based on up-to-date user and/or catalog information.

Figure 5:
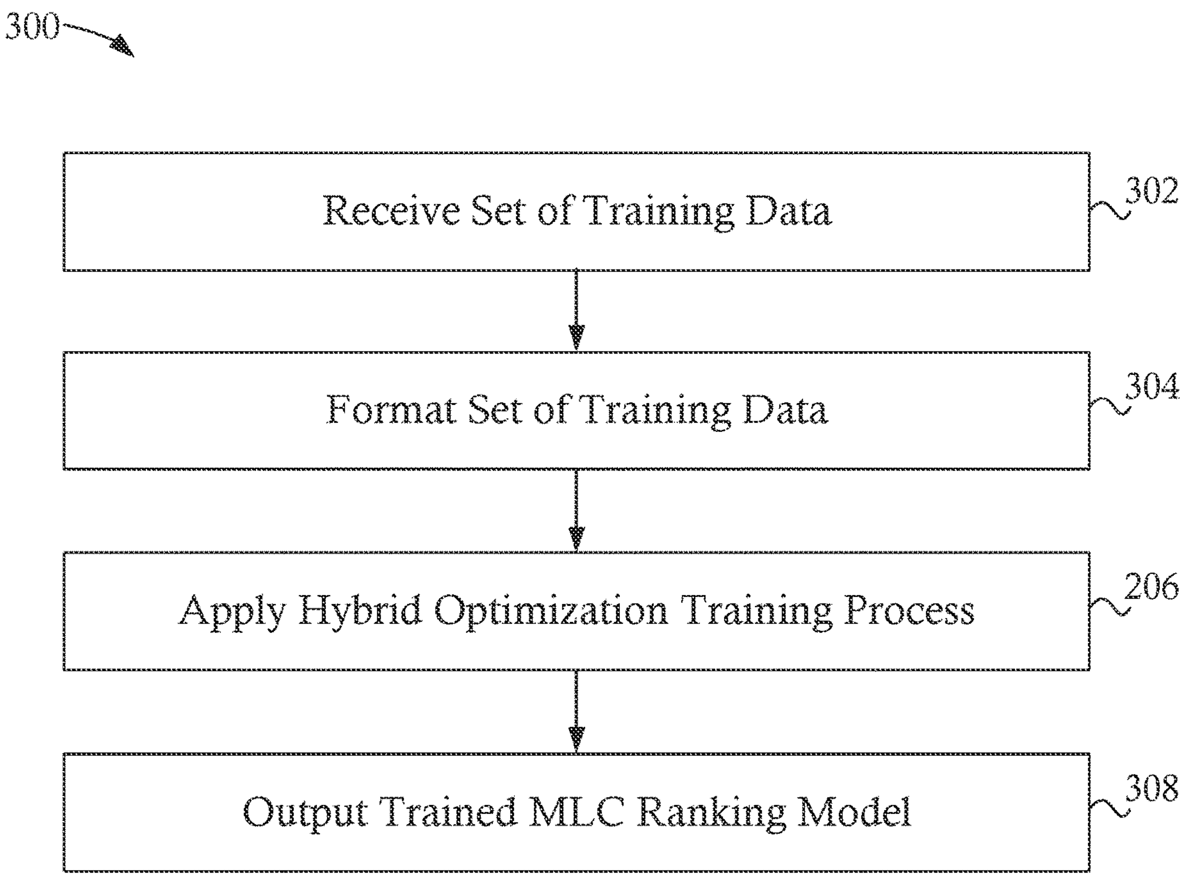
FIG. 5 is a flowchart illustrating a method of hybrid optimization training of MLC models, in accordance with some embodiments.
Figure 6:
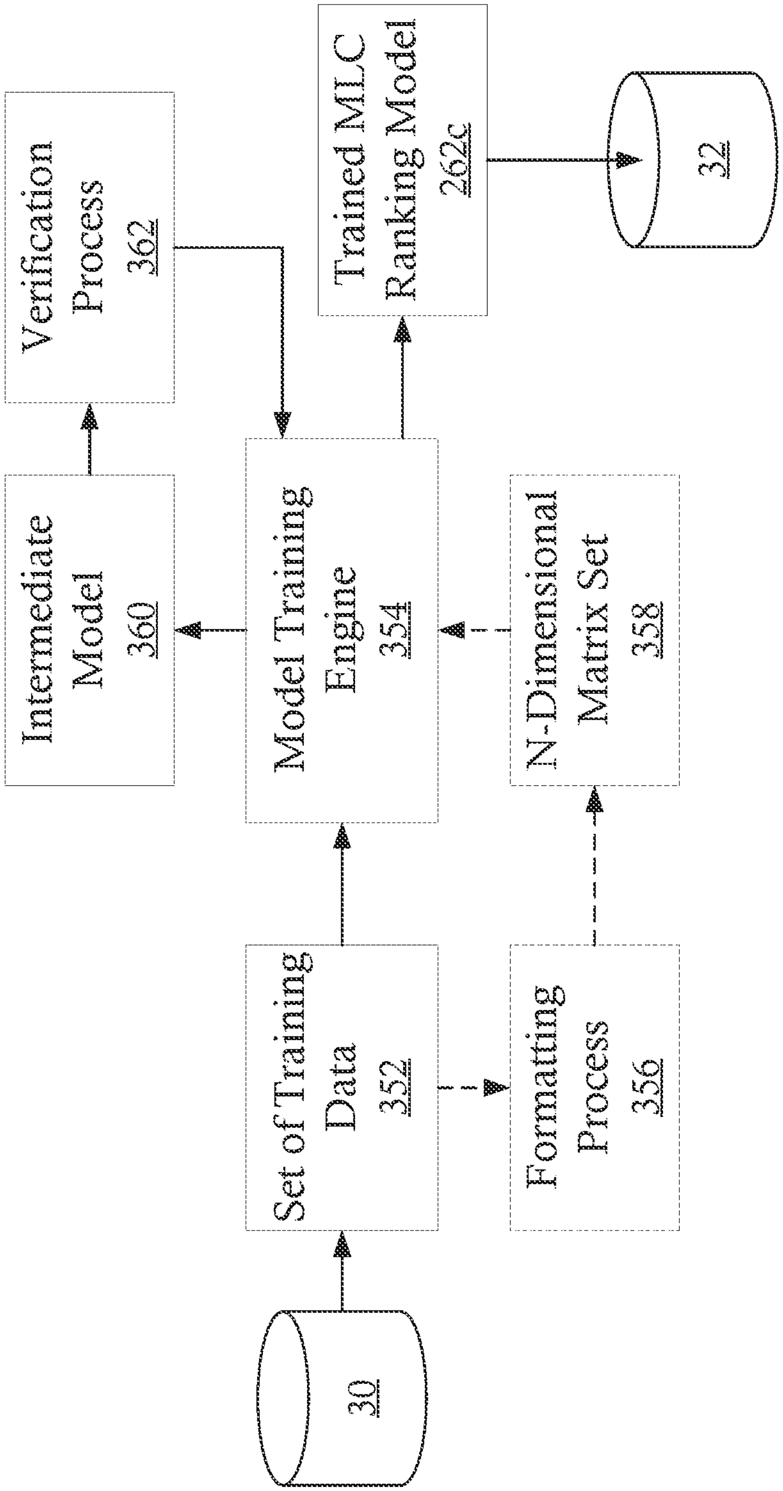
FIG. 6 is a process flow illustrating various steps of the method of hybrid optimization training of MLC models, in accordance with some embodiments.

FIG. 5 is a flowchart illustrating a method 300 of hybrid optimization training of MLC models, in accordance with some embodiments. FIG. 6 is a process flow 350 illustrating various steps of the method 300 of hybrid optimization training of MLC models, in accordance with some embodiments. At step 302, a training dataset 352 is received by a model training engine 354. The training dataset 352 can include a set of items, such as a base item (e.g., an anchor item) and one or related items (e.g., recommended items, etc.). The base item and/or the related items include one or more features, such as, for example, anchor features related to the base item. Anchor features can include, but are not limited to, features related to comparisons between the base item and the recommended item such as saving amounts (e.g., difference in price between items), price-price band features, numeric reviews, ratings, offer types, and/or any other suitable anchor features. The training dataset 352 can include additional features, such as item badge features (e.g., price tag features, fulfillment tag features, item availability features), user engagement features, context features, and/or any other suitable features.

The training dataset 352 can include ground truth data representative of user interactions resulting from an interaction including the anchor item. For example, in some embodiments, the training dataset 352 includes interaction data identifying an item in the set of recommended items that received one or more user interactions, such as a view, add-to-cart, purchase, etc., after the item was presented to a user in response to an interaction including the anchor item. As another example, in some embodiments, the training dataset 352 includes user interaction data identifying user interactions that included both the anchor item and one of the recommended items, such as purchase interactions that included both items. It will be appreciated that any suitable ground truth data can be provided for training an MLC ranking model.

In some embodiments, the training dataset 352 includes contextual features configured to provide optimization of item recommendations from a module perspective, i.e., to provide item recommendations that are intuitively related to an anchor item. For example, in some embodiments, associations between various items, such as between an anchor item and one or more recommended items, can include associations that are not immediately apparent. When such items are presented as recommended items, the discordance between the presented items and the anchor item can be jarring or off-putting for a user. For example, a user shopping for a baby stroller may not want to receive item recommendations for a bike even if the underlying feature and item sets indicate an overlap between individuals who purchase bikes and baby clothes.

In order to avoid contextually-inappropriate recommendations, in some embodiments, the training dataset 352 includes contextual features that configure a trained ranking model to generate contextually-aware recommendations. Contextual features can include, for example, item groupings, categories, defined contexts, learned contexts, and/or any other suitable contextual information. Contextual information can also include seasonal information, such as seasonal categories or campaigns, configured to train a ranking model to generate seasonally appropriate recommendations.

In some embodiments, the contextual features are configured to generate a trained MLC model that is capable of listwise ranking. A trained listwise ranking model is configured to consider the effect of items when presented next to or in addition to other items, e.g., the impact of item X placed beside item Y in a ranking. The contextual features allow the model to identify contextual impacts and to adjust recommendations to avoid negative contextual impacts between items.

In some embodiments, the training dataset 352 includes a large scale data set that can include millions of individual data elements, such as items or related features. In traditional machine learning applications, the larger the data set, the greater the computing time and power necessary to train a model on the dataset. Traditional machine learning processes utilize only a subset of large scale training datasets in order to reduce training times and computational requirements. However, the reduction process itself can introduce errors or ambiguity into the training process, as sampling within the data set must be performed and can result in skewed data sets or missing data elements within the training set.

In some embodiments, at step 304, the training dataset 352 is formatted for input to the MLC training process. For example, in embodiments including training of a listwise context-aware model, the number of items in a list of recommended items impacts the structure of the loss function and the optimization function. A loss function can be formatted and/or divided into partitions that each include a different number of recommended items and the generated loss can be jointly optimized. Further, as discussed herein, such partition/chunking can also contribute to the ease of parallelization as each chunk can be optimized in parallel to others. In some embodiments, each partitioned and/or chunked of items can be further partitioned.

In some embodiments, the training dataset 352 includes a large scale dataset that is provided to a formatting process 356 and converted into a n-dimensional matrix set 358 containing each of the elements of the input data associated each of the items in the training dataset 352. Converting to the n-dimensional matrix set 358 allows for parallelization of the gradient computation during the training process, as discussed in greater detail below. In addition, conversion of the training dataset 352 to an n-dimensional matrix set 358 can allow for better sampling of data by identifying redundancies or other patterns within the training dataset 352. Although the formatting process 356 is illustrated as being separate from the model training engine 354, it will be appreciated that the formatting process 356 can be integrated into the model training engine 354 and applied as part of the hybrid optimization training process discussed in greater detail below.

At step 306, the model training engine 354 applies a hybrid optimization training process to convert an untrained MLC base model, e.g., an untrained MNL model, into a trained MLC ranking model. In some embodiments, the hybrid optimization training process includes calculation of a relevance score for one or more items in the set of recommended items. The relevance score calculation can be generated according to:

$$s_i = f(Rec_{features}, anc_{features}, \text{seller\_features})$$

where $Rec_{features}$ is a set of features related to the recommended item, $anc_{features}$ is a set of features related to the base (or anchor) item, and seller_features are features related to the seller of the item, e.g., user engagement or context features.

In some embodiments, the model training engine 354 applies a step function, such as a gradient step function, to calculate the relevance score. The step function can include an adaptive step size. A gradient step function, e.g., a gradient descent function, includes an iterative optimization algorithm for finding a local minimum of a differentiable function. The hybrid optimization training process utilizes an adaptive, e.g., changeable, step function to define the step size of the gradient step function. The hybrid optimization training process can include an optimization process, such as, for example, a hybrid Barzilai-Borwein (BB) and line search process.

In some embodiments, the model training engine 354 is configured to optimize a log-likelihood of an interaction with a recommended item given an anchor item. Interactions can include, but are not limited to, clicks, impressions, add-to-carts, views, etc. The log-likelihood of an interaction can be optimized according to:

$$\max L = \max\left(\log(s_i) - \log\left(C + \sum_{j \in Items} \exp(s_j)\right)\right)$$

where Items is the set of recommended items and C is a constant representing a probability of no interaction for an interface. For example, when a recommended item is included in an interface, a user can either interact with (e.g., click on, add-to-cart, purchase, etc.) on one of the recommended items or can leave the interface without interacting with any recommended items. A listwise ranking method as disclosed herein integrates the potential of no interaction as one of the options for a user by including a constant C for this potentiality. Although embodiments are discussed herein including training of an MNL model, it will be appreciated that the optimization disclosed herein can be used to optimize any suitable concave log-sum-exp format process.

In some embodiments, the adaptive step size of the step function, e.g., the gradient step function, can be determined according to a second order approximation scheme, such as a first-order Barzilai-Borwein (BB) method. The BB method can define the adaptive step size as:

Patent $$a_k^{\{LBB\}} = \frac{S_{\{k-1\}}^T * S_{\{k-1\}}}{y_{\{k-1\}}^T * y_{\{k-1\}}}$$

where:

$$S_{\{k-1\}} = x_k - x_{\{k-1\}}$$

$$y_{\{k-1\}} = d_k - d_{\{k-1\}}$$

and where $x_k$ is optimized parameter points at iteration k, $S_{\{k-1\}}$ is a difference in vectors of parameters at iterations k and k−1, dk is a gradient information vector at iteration k, and $y_{\{k-1\}}$ is a difference between the gradient vectors of points at iterations k and k−1.

In some embodiments, after each m iteration of the training process, the model training engine is configured to apply a line-search optimization process alongside and/or in addition to a gradient information vector (e.g., in conjunction with and/or alternatively to the BB method discussed above). A line search is configured to attempt to find a step size that optimizes the log-likelihood function when moving from parameter value at iteration k, $x_k$, in the direction of gradient function, dk. In some embodiments, the use of the BB method and/or the line search method can be performed iteratively at different and/or variable frequencies.

Although embodiments are discussed herein including a gradient step function, it will be appreciated that the hybrid adaptive step function defined by the BB method in conjunction with a line search method can be utilized for any suitable step function, such as any suitable concave log-sum-exp function. In addition, although specific embodiments are disclosed using a BB method to generate a cost function for gradient descent, it will be appreciated that other methods, such as Broyden-Fletcher-Goldfarb-Shanno (BFGS) methods, Stochastic Gradient Descent (SGD) methods, and/or methods can be used in addition or alternatively to disclosed methods or processes.

In some embodiments, the model training engine 354 includes a parallelization architecture configured to parallelize computation of the gradient. For example, in some embodiments, the training dataset 352 is converted into an n-dimensional matrix 358 that can be divided into one or more divisions, or "chunks," with two or more chunks being processed simultaneously by parallel gradient descent processes. In some embodiments, chunking can be applied prior to and/or during the gradient descent calculation, for example, prior to and/or after calculation of item relevance scores, prior to and/or after calculation of an adaptive step, and/or at any suitable step in the hybrid optimization training process. It will be appreciated that any suitable number of chunks can be generated and/or processed in parallel by the model training engine 354.

The hybrid optimization training process includes an iterative process configured to compute multiple gradient solutions and update an intermediate trained model 360 at each step. The training process can include a predetermined number of iterations and/or an intermediate trained model 360 can be evaluated by a verification process 362 to determine when to complete the iterative training process. In some embodiments, a hybrid optimization training process is configured to continue operating until the log-likelihood converges, e.g., is maximized. The hybrid optimization training process can be scaled to larger datasets by generating additional chunks and implementing additional parallel processes within the model training engine 354.

At step 308, a trained MLC model **262*c* is output by the model training engine 354. The trained MLC model 262*c* can be provided to any suitable system, such as a ranking engine 256, for implementation. Alternatively, and/or additionally, the trained MLC model can be provided to a model store, such as a database, for storage and later deployment by one or more deployment systems. In some embodiments, the trained MLC model 262*c* is configured to provide contextually aware item recommendations for insertion into an interface for a given input set including, for example, an anchor item, one or more item features, and a set of third party seller features. In some embodiments, the trained MLC model 262*c* is provided to a model store 32** for deployment.

The disclosed method 300 of hybrid optimization training of MLC models provides a scalable training process, allowing for faster convergence of trained models through a lightweight framework that produces high-quality ranking models. By utilizing the disclosed hybrid optimization training process, a model training engine 354 can train new models at a higher frequency, and therefore capture changes in training data that would otherwise be missed over larger training periods. Faster training and deployment of MLC models according to the disclosed methods provides for recommended items incorporated into a user interface to be flexible and reflect changing inputs and needs, such as changing seasonal trends or considerations.

The disclosed method 300 of hybrid optimization training of MLC models further provides a reduction in computational requirements, as the parallel processing provides a faster (e.g., fewer iterations), but less intense (e.g., easier computations), training process. The reduction in computational requirements provides a reduced load to computational clusters, allowing for additional models to be trained and deployed and/or the computational clusters to be devoted to additional processes. By decreasing the computational requirements, the method 300 provides for a reduction in cost to train, deploy, and utilize trained MLC models.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a non-transitory memory configured to store a training dataset comprising a plurality of anchor items, a plurality of recommended item sets, and ground truth data;

a processor communicatively coupled to the non-transitory memory, wherein the processor is configured to read a set of instructions to:

obtain, from the non-transitory memory, the training dataset;

obtain a base machine learning model that includes a step function that determines a relevance score;

iteratively train the base machine learning model to generate a trained ranking model, wherein the plurality of anchor items and the plurality of recommended item sets are provided as an input to the base machine learning model and the ground truth data is provided as a target output, and wherein the step function of the base machine learning model is trained using an adaptive step size according to a first order Barzilai-Borwein (BB) process and a line search process;

receive a request for recommended items for a user, wherein the request comprises interaction data characterizing user interactions for the user;

generate, using the trained ranking model, ranking data identifying an ordered set of items based on the interaction data;

transmit the ranking data to a user device for display on a user interface;

receive user interaction data characterizing user interactions between a plurality of users and the user interface;

re-train the trained ranking model using the user interaction data to update the trained ranking model, wherein the step function of the trained ranking model is re-trained using the adaptive step size and the line search process; and store the re-trained ranking model in the non-transitory memory.

2. The system of claim 1, wherein the base machine learning model includes a gradient descent model.

3. The system of claim 2, wherein iteratively training the base machine learning model includes implementing a plurality of parallel gradient descent steps, wherein each of the plurality of parallel gradient descent steps operates on a chunk of the training dataset.

4. The system of claim 1, wherein the base machine learning model comprises a multinomial logit model, and wherein the trained ranking model comprises a multinomial logit choice model.

5. The system of claim 1, wherein the adaptive step size is determined based on a difference between optimized parameter points and a gradient information vector at a prior iteration and a current iteration.

6. The system of claim 1, wherein the relevance score is determined based on a set of features related to a recommended item in one of the plurality of recommended item sets, a set of features related to a corresponding anchor item in the plurality of anchor items, and features related to a seller of the recommended item.

7. The system of claim 1, wherein the base machine learning model is trained to optimize a log-likelihood of an interaction with a first recommended item in one of the plurality of recommended item sets given a related anchor item in the plurality of anchor items.

8. The system of claim 1, wherein iteratively training the base machine learning model includes converting the training dataset to a n-dimensional matrix.

9. The system of claim 1, wherein the BB process and line search process are performed iteratively with different frequencies.

10. A computer-implemented method, comprising:

obtaining, from a first database, a training dataset comprising a plurality of anchor items, a plurality of recommended item sets, and ground truth data;

obtaining a base machine learning model that includes a step function that determines a relevance score;

training the base machine learning model to generate a trained ranking model, wherein the plurality of anchor items and the plurality of recommended item sets are provided as an input to the base machine learning model and the ground truth data is provided as a target output, and wherein the step function of the base machine learning model is trained using an adaptive step size;

receiving a request for recommended items for a user, wherein the request comprises interaction data characterizing user interactions for the user;

generating, using the trained ranking model, ranking data identifying an ordered set of items based on the interaction data;

transmit the ranking data to a user device for display on a user interface;

receiving user interaction data characterizing user interactions between a plurality of users and the user interface;

re-training the trained ranking model using the user interaction data to update the trained ranking model, wherein the step function of the trained ranking model is re-trained using the adaptive step size and the line search process; and storing the trained ranking model in a second database.

11. The computer-implemented method of claim 10, wherein iteratively training the base machine learning model includes implementing a plurality of parallel gradient descent steps, wherein each of the plurality of parallel gradient descent steps operates on a chunk of the training dataset.

12. The computer-implemented method of claim 10, wherein the base machine learning model comprises a multinomial logit model, and wherein the trained ranking model comprises a multinomial logit choice model.

13. The computer-implemented method of claim 10, wherein the adaptive step size is determined based on a difference between optimized parameter points and a gradient information vector at a prior iteration and a current iteration.

14. The computer-implemented method of claim 10, wherein the relevance score is determined based on a set of features related to a recommended item in one of the plurality of recommended item sets, a set of features related to a corresponding anchor item in the plurality of anchor items, and features related to a seller of the recommended item.

15. The computer-implemented method of claim 10, wherein the base machine learning model is trained to optimize a log-likelihood of an interaction with a first recommended item in one of the plurality of recommended item sets given a related anchor item in the plurality of anchor items.

16. The computer-implemented method of claim 10, wherein iteratively training the base machine learning model includes converting the training dataset to a n-dimensional matrix.

17. A non-transitory computer-readable medium having instructions stored thereon, wherein the instructions, when executed by at least one processor, cause a device to perform operations comprising:

obtaining, from a first database, a training dataset comprising a plurality of anchor items, a plurality of recommended item sets, and ground truth data;

obtaining a base machine learning model that includes a step function that determines a relevance score;

training the base machine learning model to generate a trained ranking model, wherein the plurality of anchor items and the plurality of recommended item sets are provided as an input to the base machine learning model and the ground truth data is provided as a target output, and wherein the step function of the base machine learning model is trained using an adaptive step size according to a first order Barzilai-Borwein (BB) process and a line search function;

receiving a request for recommended items for a user, wherein the request comprises interaction data characterizing user interactions for the user;

generating, using the trained ranking model, ranking data identifying an ordered set of items based on the interaction data;

transmit the ranking data to a user device for display on a user interface;

receiving user interaction data characterizing user interactions between a plurality of users and the user interface;

re-training the trained ranking model using the user interaction data to update the trained ranking model, wherein the step function of the trained ranking model is re-trained using the adaptive step size and the line search process; and storing the trained ranking model in a second database.

18. The non-transitory computer-readable medium of claim 17, wherein the base machine learning model comprises a multinomial logit model, and wherein the trained ranking model comprises a multinomial logit choice model, and wherein iteratively training the base machine learning model includes implementing a plurality of parallel gradient descent steps, wherein each of the plurality of parallel gradient descent steps operates on a chunk of the training dataset.

19. The non-transitory computer-readable medium of claim 17, wherein the adaptive step size is determined based on a difference between optimized parameter points and a gradient information vector at a prior iteration and a current iteration and wherein the relevance score is determined based on a set of features related to a recommended item in one of the plurality of recommended item sets, a set of features related to a corresponding anchor item in the plurality of anchor items, and features related to a seller of the recommended item.

20. The non-transitory computer-readable medium of claim 17, wherein iteratively training the base machine learning model includes converting the training dataset to a n-dimensional matrix.

* * * * *